Dec. 22, 1959  E. B. FARMER  2,918,585
PHOTOELECTRIC MOUNT
Filed April 11, 1958

Inventor
Edward B. Farmer
by Roberts, Cushman & Grover
Attys.

United States Patent Office 2,918,585
Patented Dec. 22, 1959

2,918,585

PHOTOELECTRIC MOUNT

Edward B. Farmer, Waban, Mass.

Application April 11, 1958, Serial No. 727,991

4 Claims. (Cl. 250—239)

The field of the present invention is generally that of photoelectric systems which require the convenient and yet secure and exact mounting and optical adjustment of light emitting and light sensitive elements; more particularly, the invention is concerned with focusing mounts for photoelectric cells and light sources.

Objects of the invention are to provide photocell or lamp mounts of comparatively small size permitting the convenient and yet reasonably exact adjustment of an optical lens that is in front of the photocell or the lamp, to provide such mounts which permit convenient and exact adjustment of the focal plane of lens means between photocell and lamp substantially simultaneous with the secure mounting on a support of at least one of the housings for photocell and lamp, to provide for the convenient optical adjustment of the light beam, whether direct or reflected, between the lamp and the photocell, to provide a photocell or lamp housing for the above purpose which can be conveniently and securely mounted in various optional ways one of which is combined with an essentially simultaneous focal plane securing operation, and generally to provide photoelectric mounting assemblies which are exceptionally simple and uncomplicated in manufacture and assembly and therefore comparatively inexpensive, but which are nevertheless rugged, exact and durable, and particularly also adaptable to a large variety of practical applications.

A brief summary of the invention serving to indicate its nature and substance for attaining the above objects is as follows.

A mount constructed according to the invention, for photoelectric systems with a light emitting element or lamp and a light sensitive element or photocell comprises the following components: a housing having a tapped opening with an outer face transverse to its axis, conventional means for fastening within the cavity of the housing a photocell or lamp for optical access through the opening, an optical tube having at one end a thread that fits and is screwed into the tapped opening of the housing and which clears and preferably surrounds the photocell or lamp that is fastened within the housing, optical lens means mounted on the other end of the tube, and female screw means such as a nut fitting the thread of the tube. This arrangement permits adjustment of the plane where an image of the lamp filament or other emitter is formed more or less sharply, the fixating of this optical adjustment and the mounting of the housing, by inserting the tube into an opening of a support such as a panel, by then focusing the lens through rotation of the tube while the face of the housing abuts against the support and by then tightening the nut against the support and the housing.

In another aspect of the invention two housings, for a photoelectric cell and a lamp respectively, are combined with supporting means in such a manner that either one can be optically adjusted relatively to the other while being fastened to a panel or similar supporting means, the final fastening to the support being simultaneous with the final fixation of the adjustment, by tightening a nut on a threaded focusing tube which reaches through an opening of the supporting means.

These and other objects and characteristic aspects of the invention will appear from the herein presented description of its mode of operation, of its practical possibilities and of a practical embodiment illustrating its novel features.

The description refers to a drawing in which.

Figure 1:
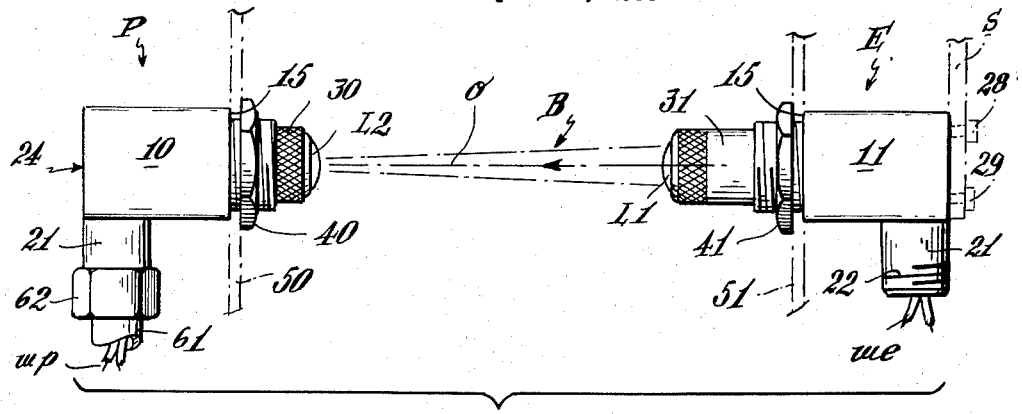
Fig. 1 is an elevation of a photoelectric system according to the invention comprising a light emitting unit E and a photosensitive unit P, mounted in optically focused relation.

In Fig. 1, P is a photocell unit and L is a lamp unit, the units being aligned on an optical axis $o$. The light beam B coming from the light emitting unit E affects a light sensitive device within unit P in conventional manner, and it will be understood that operation can take place with direct light or reflected light, and that in the latter instance the optical axis $o$ will be deflected on a reflecting surface. Objects coming between the two units, or a change of reflectivity of a light deflecting surface, or accidental or intentional change of light emission will affect the light energy that reaches the unit P from the unit E, in well known fashion.

Figure 3:
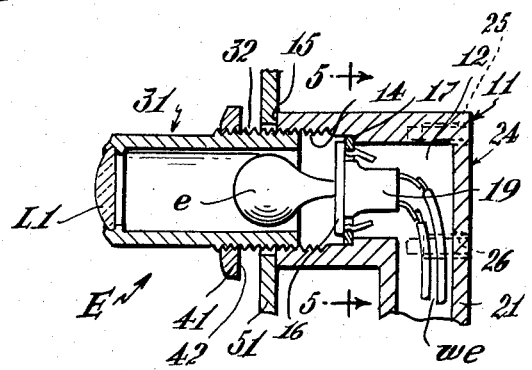
Fig. 3 is an axial section similar to Fig. 2 through the unit E of Fig. 1.
Figure 4:
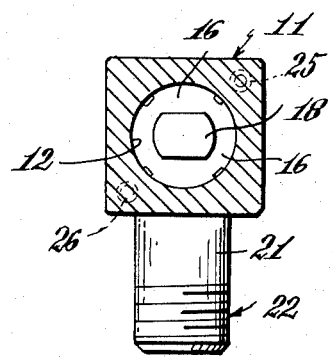
Fig. 4 is a cross section on lines 4—4 of Fig. 2.
Figure 5:
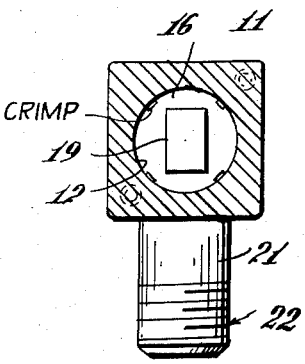
Fig. 5 is a cross section on lines 5—5 of Fig. 3.

Both units, P and L, have housings 10, 11 which are preferably identical for both but not necessarily so, so long as each incorporates the elements which are characteristic of the invention. Each housing has a cavity 12 (Figs. 2 to 5) which opens into a threaded portion 14 having a flat outer face 15 transverse to the thread axis $o$. A plate or board 16 is fastened to a shoulder 17 by conventional means, for example by crimping at three or more points as indicated in Figs. 4 and 5. The plate 16 in turn carries a socket 18, 19 for the photocell $p$ or the lamp $e$. It will be understood that these sockets and other mounting and connecting means for lamp and photocell are conventional and can be of any construction that is suitable for the purpose at hand.

In a successful practical embodiment, the light source is a so-called GE #12 "Hot Appliance" bulb, and the photocell is a so-called "Clairex" CL-3 cadmium selenide cell or a "Cetron" CE-705D3 lead sulfide cell.

Figure 2:
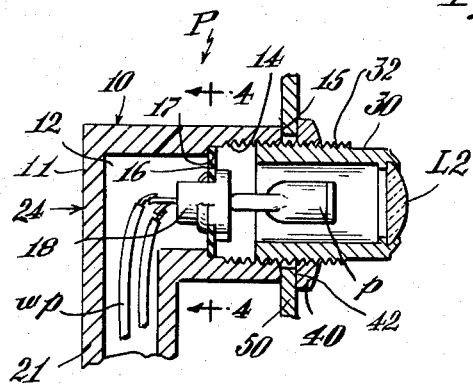
Fig. 2 is an axial section through the unit P of Fig. 1.

Extending laterally from the housing 11 is arranged a short tubular stub 21 which can be threaded as indicated at 22 of Fig. 1 and which leads into the flat outside 24 of the bottom of housing 10 or 11. This tubular stub serves for protecting the lead wires $wp$ and $we$, as indicated in Figs. 1 to 3. As indicated in Figs. 3 to 5 the bottom of the units can be provided with mounting holes 25 and 26.

A focusing tube 30 or 31 has an outside thread 32 which fits the inside thread 14 of the housing 10 or 11. To the other, outer, end of the tube or tubes is fastened by convenient means an optical lens L1 or L2. A nut 40 or 41 which fits the thread 32 of the tube 30 or 31 can be inserted over the lens L1 or L2 and tightened with its face 42 against the face 15 of the housing or any other face interposed therebetween. As indicated in Figs. 1 to 3, this nut is preferably used to mount a respective unit on a panel 50 or 51 in the manner to be described hereinbelow. The lenses L1 and L2 are of conventional design and their focal lengths are selected in accordance with the distance of the units and the dimensions of the light emitting and light sensitive elements. A reasonable range of optical properties can be provided by making the focal lengths of lenses L1 and L2 slightly different and by exchanging the lenses between units P and E in accordance with requirements. For similar reasons, one of the tubes can be made somewhat longer, as indicated for tube 31 of unit E.

The mounting and mode of operation of systems according to the invention take place as follows.

Figure 6:
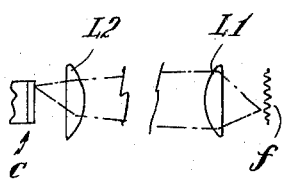
Fig. 6 is a diagram of the optical system.

In order to focus the lamp filament on or near the light responsive coating of the photocell, as indicated in Fig. 6, it is in most instances sufficient to adjust the lamp lens L1. For that purpose the tube 30 of housing 10 is removed and that housing held in correct position for example by contacting its face 15 against the panel 50. The other housing, 11, is similarly held against its support, for example panel 51, but with the tube 31 in place. The desired location and sharpness of the image of filament $f$ is then obtained by rotating tube 31 and by observing the image on the photocell in the other housing. The lens L2 of the unit P, if such a lens is used, can be employed to diffuse the image of the lamp filament, and its effect can be easily predetermined and taken into account when focusing the filament image with lens L1. In the present embodiment, both lenses have a focal length of 5/8". It will be understood that, according to requirements, the lenses can have different focal lengths and that the adjustment possibilities can be widened by making the interchangeable focusing tubes of different length and hence focusing range. For example, with two 5/8" lenses, and with the longer tube on the lamp housing as herein shown, a sharp image about 1/8" long of the GE #12 lamp filament, is projected at a distance of 3¼" from the bottom of the housing 11.

After the focal length has been properly adjusted, the nuts 40 and 41 are tightened thereby fixating the two optical systems as well as tightly confining the panels or other mounting means between the faces 42 of the nut and the faces 15 of the housings.

Ordinarily one of the units, most conveniently the photocell unit P, will be mounted first, as indicated in Fig. 2. As shown in Fig. 3, the lamp unit is held in position, while being adjusted, with its nut 41 loosely on tube 31. The nut is tightened after the tube has attained its proper position relatively to the lamp filament. While panels are indicated in all instances, it will be understood that, although the mounting of the unit on a panel combined with simultaneous fixation of the focal length is preferred, other modes of fastening are possible, with the nut used only for permanently setting the optical adjustment.

Instead of using the nuts 40 or 41 on the tube threads 32 for engaging the panel 50 or 51, one or both units can be screwed to a support by means of the above mentioned holes 26 which are tapped for this purpose, as indicated for the unit E in Fig. 1, where $s$ is a suitable support and the screws 28 and 29 engage the tapped holes 25, 26 through appropriate holes of the support $s$.

Another possibility of mounting the units is indicated for the unit P of Fig. 1. In this instance the stub 21 is in conventional manner mounted on conduit tubing 61 by means of a connector nut 62. The nut 40 will nevertheless be used for fixing the optical adjustment.

If desired only one unit can be provided with the focusing lens device whereas the other unit, preferably the photocell unit P, can have a protective plate instead of the lens L.

It will thus be apparent that the system according to the invention provides wide versatility and adaptability with regard to making and fixating optical adjustments as well as with regard to mounting the units in a manner most suitable for the purpose at hand.

It will further be evident that the construction of the present system provides for interchangeable parts of photocell and lamp units which facilitates the manufacture, storing and assembling of installations to which the invention is applied.

It should be understood that the present disclosure is for the purpose of illustration only and that this invention includes all modifications and equivalents which fall within the scope of the appended claims.

I claim:
1. In photoelectric systems with a light emitting element and a light sensitive element, a focusing mount for one of the elements, comprising: a housing having an opening with a thread and an outer face transverse to the thread axis of said opening; means for fastening the element in said housing independently of said thread essentially in optical alignment with said axis; tube means having at one end an optical lens and at the other end a thread fitting the thread of said opening; and nut means fitting said threads; whereby the element can be focused by turning the tube means relatively to the housing, and the focal plane fixed and the housing attached to a mounting means between nut means and housing by tightening the nut means.

2. In photoelectric systems with a light emitting element and a light sensitive element, a focusing mount for one of the elements, comprising: a housing having a cylindrical cavity closed on one side and having on the other side an opening with an inside thread and a flat outer face transverse to the thread axis; means for fastening the element in said housing independently of said thread essentially in optical alignment with said axis; a tube having at one end an optical lens and at the other end an outside thread fitting said inside thread of the housing; mounting means having an opening that accommodates the outside of said tube, abutting against said flat face; and nut means fitting said outside thread of said tube and tightened against said mounting means and said face; whereby the element can be focused by turning the tube relatively to the housing, and the focal plane fixed and the housing attached to the mounting means by tightening the nut means.

3. A focusing photoelectric system with a light emitting element and a light sensitive element, comprising: two housings each having an opening with a thread and an outer face transverse to the thread axis of said opening, and each housing having means for fastening therein independently of said thread a respective one of said elements for optical access on said axis through said opening; two optical tube means one for each housing each tube means having at one end a thread fitting and screwed to said threaded opening; optical lens means mounted on the other, outer, end of at least one of said tube means; and nut means fitting said threads; whereby the tube means of at least one housing can be inserted into an opening of a support with the outer face of the housing abutting thereagainst, the respective element can be focused by rotating the respective tube means, and the focus can be fixed and the housing fastened to the support by tightening the nut means.

4. A focusing photoelectric system with a light emitting element and a light sensitive element, comprising: two housings each having a cavity with a cylindrical opening leading with an inner thread to a flat outer face transverse to the thread axis, and each housing having means for fastening therein independently of said thread a respective one of said elements for optical access on said axis through said opening; two optical tubes one for each housing each tube having at one end an outside thread fitting and screwed into said threaded opening, surrounding said element at said end; optical lens means carried on the other, outer, end of at least one of said tubes; and nut means on said outside thread of at least the tube carrying said lens means; and panel means having opening means for at least one of said housings accommodating the tube of that housing and abutting against the flat face of the housing; whereby the tube of at least one housing can be inserted into an opening of the panel means with the outer face of the housing abutting thereagainst, the respective element can be focused by rotating the respective tube, and the focal plane can be fixed and the housing fastened to the panel means by tightening the nut means.

References Cited in the file of this patent

UNITED STATES PATENTS

| | | |
|---|---|---|
| 1,858,819 | Corbett | May 17, 1932 |
| 2,442,462 | Kirschbaum | June 1, 1948 |
| 2,681,980 | Harrington | June 22, 1954 |
| 2,712,611 | Nyman | July 5, 1955 |
| 2,720,810 | Senn | Oct. 18, 1955 |
| 2,812,915 | Davies et al. | Nov. 12, 1957 |